Patented May 20, 1941

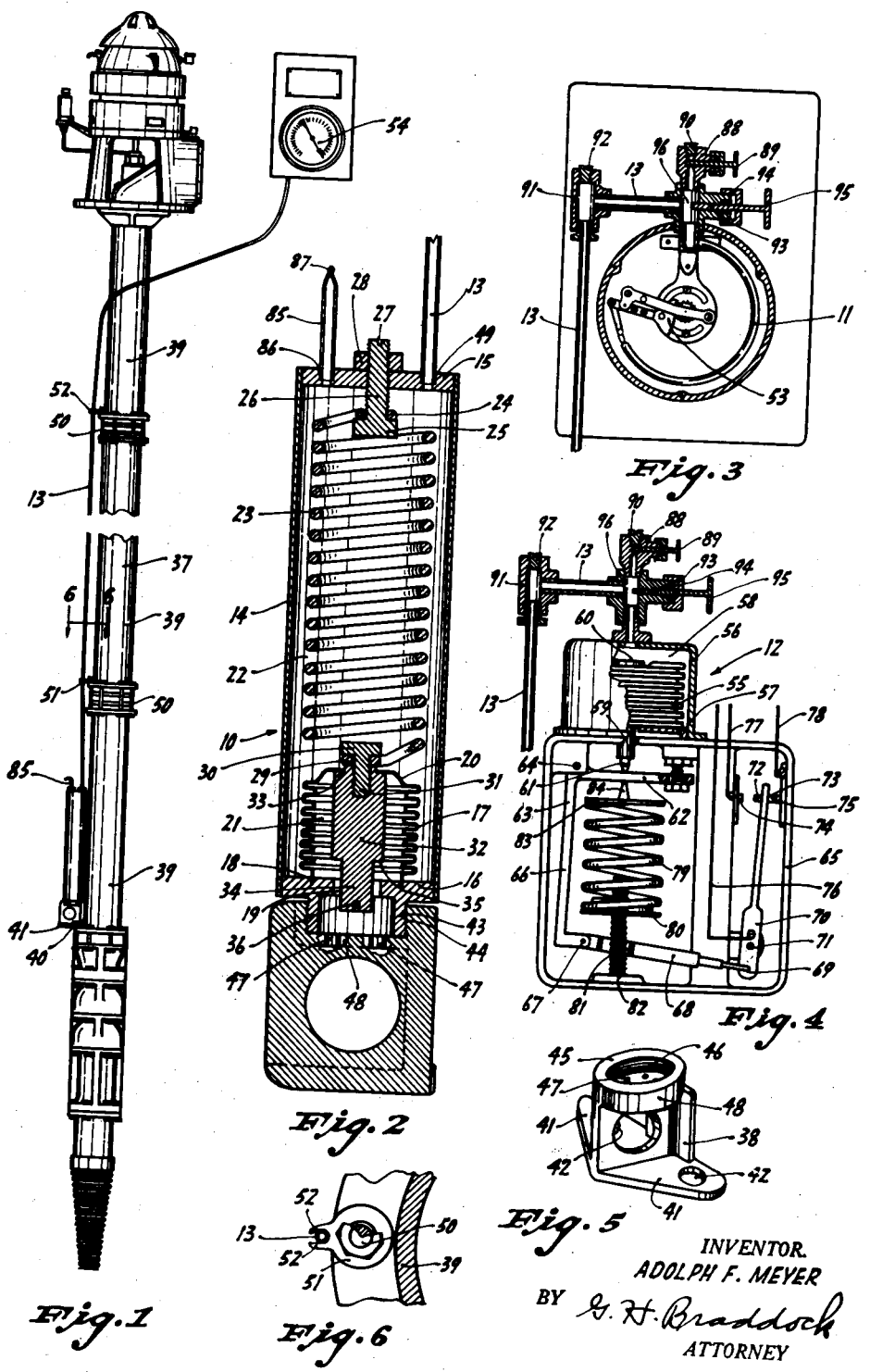

2,242,589

UNITED STATES PATENT OFFICE 2,242,589

LIQUID LEVEL INDICATOR

Adolph F. Meyer, Minneapolis, Minn.

Application April 7, 1938, Serial No. 200,664

3 Claims. (Cl. 73—299)

This invention relates to a liquid level indicator, and has reference to a liquid level indicator particularly adapted to the purpose of denoting the level of liquid in a deep well, so-called, but, at the same time, satisfactorily useful to denote the level of liquid in any well, vessel or tank.

An object of the invention is to provide a liquid level indicator of novel and improved construction.

A further object is to provide a liquid level indicator wherein will be incorporated various improved features and characteristics of construction novel both as individual entities of the liquid level indicator and in combination with each other.

A further object is to provide a liquid level indicator which will consist of a liquid-filled transmitter adapted to be placed in a well, vessel or tank containing water or other liquid below the lowest level of water or liquid expected in said well, vessel or tank, a liquid-filled pressure-responsive element adapted to be situated above the well, vessel or tank, and a liquid-filled tube or pipe extending between and connecting said transmitter and pressure-responsive element with each other.

A further object is to provide in the liquid level indicator, a liquid-filled transmitter of novel and improved construction.

A further object is to provide a liquid level indicator which will consist of a liquid-filled transmitter, a liquid-filled pressure-responsive element and a liquid-filled tube or pipe connecting said transmitter and pressure-responsive element with each other, as before stated, and which transmitter will include a flexible element, such as a bellows or diaphragm, for example, adapted to be subjected to pressure of water or liquid in a well, vessel or tank and a spring supporting said flexible element and carrying the weight or pressure, or a portion of the weight or pressure, represented by the column of liquid in said liquid level indicator extending from the flexible element, to, or approximately to, said pressure-responsive element and operative in opposition to pressure of water in said well, vessel or tank, the whole arranged so that said pressure-responsive element will be directly subjected to pressure or depth of water or liquid in the well, vessel or tank.

A further object is to provide a liquid level indicator of the character as set forth in the immediately preceding paragraph, wherein said pressure-responsive element will be dependent in its operation upon alteration of the level of water or liquid in the well, vessel or tank by direct transmission to the pressure-responsive element of pressure exerted by water or liquid in said well, vessel or tank and opposed by said column of liquid in said liquid level indicator extending between said flexible element and pressure-responsive element, and wherein the pressure-responsive element will actuate, or constitute a part of, an entity, such, for example, as a gage or switch mechanism, adapted to denote or cause to be signified the level of water or liquid in said well, vessel or tank.

A further object of the invention is to provide a liquid level indicator which will include as a part thereof a liquid-level transmitting entity adapted to be placed below water or liquid level in a well, such as a so-called deep well, and supported upon or carried by a pump intended to operate in said well, as, for example, a deep well pump.

A further object is to provide a liquid level indicator which will include as a part thereof a liquid level transmitter adapted to be placed in a well below the lowest level of water or liquid expected in said well and to be removably assembled in novel and improved manner with a pump intended to operate in said well.

And a further object is to provide a liquid level indicator which will consist of a liquid-filled transmitter adapted to be placed in a well containing water or liquid below the lowest level of water or liquid expected in said well, a liquid-filled pressure-responsive element, and a liquid-filled tube or pipe connecting said transmitter and pressure-responsive element with each other, and which liquid-filled transmitter will be adapted for assembly, desirably removably, with a pump intended to operate in said well.

With the above objects in view, as well as others which will appear as the specification proceeds, the invention comprises the construction, arrangement and combination of parts as now to be fully described and as hereinafter to be specifically claimed; it being understood that the disclosure herein is merely illustrative and intended in no way in a limiting sense, changes in details of construction and arrangement of parts being permissible so long as within the spirit of the invention and the scope of the claims which follow.

In the accompanying drawing forming a part of this specification,

Fig. 1 is an elevational view of a liquid level indicator including the principles of the invention, said liquid level indicator being disclosed applied to or assembled with a deep well or other pump;

Fig. 2 is an enlarged central vertical sectional view of the liquid-filled transmitter of the liquid level indicator of Fig. 1;

Fig. 3 is a detail view of the pressure-responsive element of the liquid level indicator of Fig. 1, said pressure-responsive element being constituted as a part of the gage of said liquid level indicator as in said Fig. 1;

Fig. 4 is a detail view of a pressure-responsive element of modified construction adapted to be substituted for the gage of Fig. 1, or used therewith, as a part of a liquid level indicator made according to the invention, the disclosure of Fig. 4 also including a switch mechanism adapted to be actuated by said modified pressure-responsive element;

Fig. 5 is an enlarged perspective view of a fixture of the liquid-filled transmitter of the liquid level indicator of Fig. 1 by means of which said transmitter may be secured to said deep well or other pump; and Fig. 6 is an enlarged sectional view, taken on line 6—6 in Fig. 1.

The liquid level indicator includes three main parts, namely, a liquid-filled transmitter 10, a liquid-filled pressure-responsive element, represented 11 and constituted as a Bourdon tube in Fig. 3 and indicated 12 and constituted in part by a bellows in Fig. 4, and a liquid-filled tube or pipe 13 extending between and connecting said transmitter 10 and pressure-responsive element, 11 or 12, as the case may be, with each other. The transmitter 10 is adapted to be placed in a well, vessel or tank (not shown) containing water or other liquid desirably below the lowest level of water or liquid expected to possibly exist in said well, vessel or tank, and the pressure-responsive element, 11 in Fig. 3 and 12 in Fig. 4, is adapted to be situated above the well, vessel or tank which contains said transmitter 10.

The transmitter 10 as disclosed includes an upright, hollow cylindrical member 14 having upper and lower closure walls, denoted 15 and 16, respectively, therein which provide, together with said cylindrical member, a housing of said transmitter. A flexible element 17 of the transmitter is constituted as a bellows within said housing having the full circumference of its lower, open end 18 suitably and conveniently connected to the lower closure wall 16 about an opening 19 through said lower wall, and having its upper, closed end 20 arranged in slightly spaced relation to the lower closure wall 16 and in considerably spaced relation to the upper closure wall 15. The side wall of the flexible element, bellows, or equivalent, 17 is in spaced relation to the side wall of the upright cylinder 14.

The inner, hollow portion 21 of the flexible element or bellows 17 is adapted to be subjected to pressure of water or liquid in a well, vessel or tank which enters said flexible element or bellows 17 through the opening 19 in the lower closure wall 16, and pressure of water or liquid within said flexible element or bellows 17 will of course have tendency toward causing it to become elongated or elevated.

As before stated, the transmitter 10 is liquid-filled. That is to say, the space 22 within the cylindrical member 14 between its upper closure wall 15 and its lower closure wall 16 and about the flexible member or bellows 17 contains a solid column of liquid. As also before stated, the tube or pipe 13 and the pressure-responsive element 11 or 12 are also each liquid-filled, the liquid in all of said transmitter, pressure-responsive element and tube or pipe being of the same composition. A liquid of any composition suitable to its purpose may be employed to solidly fill, in a manner to be set forth, the whole of the transmitter, pressure-responsive element and connecting tube or pipe of the liquid level indicator. For example, the liquid employed in said liquid level indicator may be glycerine, diethylene glycol, prestone, ethylene glycol, hygropon tech N, hygropon tech extra, and various combinations of these liquids may be used with certain oils or water. In any event, the liquid employed will desirably be of non-freezing nature.

A coil spring 23 within the space 22 of the transmitter 10, above the flexible element or bellows 17, is adapted to support said flexible element or bellows and to carry the weight or pressure, or a portion of the weight or pressure, of the column of liquid in the liquid level indicator extending from and above the flexible element or bellows 17 to, or substantially to, the pressure-responsive element 11 or 12, as the case may be. The upper end of the coil spring 23 is secured, as at 24, about and above a shoulder 25 of a screw 26 in the upper closure wall 15 adapted to support said coil spring. Said screw 26 extends upwardly through said wall 15 and the upper end of the screw is provided with a transverse slot 27 for rotatably adjusting the screw to cause its shoulder 25 to be raised or lowered to thus adjust the coil spring 23. A lock nut for the screw 26 is indicated 28. The lower end of said coil spring 23 is secured, as at 29, about and below a shoulder 30 of a screw 31 turned into a vertical post 32. Said post 32 is secured, as at 33, in a central opening in the upper end 20 of the flexible element or bellows 17 and extends downwardly centrally through said flexible element or bellows in spaced relation to its side wall. A lower portion of the vertical post 32 is of reduced diameter, as at 34, to provide a downwardly facing shoulder 35 of said post, and the reduced portion 34 extends downwardly centrally through the opening 19 in the lower closure wall 16 in spaced relation to the material of said wall 16 defining said opening 19. The downwardly facing shoulder 35 of the vertical post 32 constitutes a stop adapted to engage a portion of the upper surface of the lower closure wall 16 about or adjacent to the opening 19 to limit downward movement of said post 32 and the closed, upper end 20 of the flexible element or bellows 17. A transverse stud 36 in the lower end of the reduced portion of the vertical post 32 and in spaced relation to the downwardly facing shoulder 35 is disposed below the opening 19 and constitutes a stop adapted to engage a portion of the lower surface of said lower closure wall 16 adjacent said opening 19 to limit upward movement of the post 32 and said closed, upper end 20 of said flexible element or bellows. That is to say, the flexible element or bellows 17 is adapted to have controlled expanding and contracting action or movement, lengthening movement of said flexible element or bellows being limited by engagement of the transverse stud 36 with the lower surface of the lower closure wall 16 and shortening movement of said flexible element or bellows being limited by engagement of the downwardly facing shoulder 35 with the upper surface of said lower closure wall.

A deep well pump is represented 37, and the transmitter 10 is as shown removably secured to a lower portion of said pump by means of a fixture or special foot 38. The pump 37 consists of vertical detachably connected water columns 39 arranged one below the other. Bolts 40 which connect elements of said pump to each other may be employed to secure the fixture or special foot 38 to the pump. To this purpose, said fixture or special foot includes oppositely disposed, horizontal flanges 41 each with opening 42 to receive a bolt 40. Said bolts 40 attach the transmitter 10 to the pump 37 so that said transmitter is in upstanding position and in parallel relation to said pump. In order that the fixture or special foot 38 may support the housing of the transmitter 10, constituted by the hollow cylindrical member 14, the upper closure wall 15 and the lower closure wall 16, said lower closure wall is provided with a depending annular flange 43 disposed about the opening 19 having an external thread 44 thereon, and said fixture or special foot 38 is provided with an upstanding annular flange 45 having an internal thread 46 adapted to be turned home upon the external thread 44 of the depending annular flange 43. Ports 47 through a wall 48 of the fixture or special foot 38 are for the purpose of allowing passage of water through the opening 19 into the interior of the flexible member or bellows 17.

The lower end of the tube or pipe 13 extends upwardly from the transmitter 10 and is in communication with the interior space 22 of said transmitter. Said tube or pipe 13 is secured to the upper closure wall 15 as at 49. The separate water columns 39 are flanged and are held to each other by bolts 50, and the tube or pipe 13 is held to the water columns by spaced apart clips 51 each of which is secured to a water column by a bolt 50. Each clip 51 has two spaced apart prongs 52 which may be placed about the tube or pipe 13 and sufficiently closed to prevent said tube or pipe from slipping clear of the clip, as by a hammer blow upon said prongs.

In Figs. 1 and 3 the pressure-responsive element 11 is constituted as a Bourdon tube with the interior of which the tube or pipe 13 communicates, and said Bourdon tube is associated, as denoted generally at 53, with a gage 54 to actuate said gage in response to actuation of said pressure-responsive element or Bourdon tube 11 by alteration of level of water or liquid the pressure of which is adapted to be imparted to the interior space 21 of the flexible element or bellows 17.

In Fig. 4 the pressure-responsive element 12 consists of a bellows, or equivalent, 55 in a suitably closed housing 56. The full circumference of the lower end of the bellows 55 is anchored, as at 57, to provide an enclosed space 58 within the housing 56 and above and about the bellows 55 with which the tube or pipe 13 communicates. A post 59 at the interior of the bellows 55 has its upper end secured to the inner side of the closed upper end 60 of said bellows and the lower end portion of said post is disposed below the bellows. As shown, the lower end of the post 59 includes a pin 61 in engagement with the upper surface of the horizontal arm 62 of an L lever 63 pivoted at 64 upon a frame 65 which supports the pressure-responsive element 12. Said L lever 63 includes a vertical arm 66 having its lower portion pivoted at 67 to one end of a substantially horizontal link 68. The other end of said link 68 is pivoted at 69 to an end of a movable conducting element 70. Said conducting element 70 is pivoted upon the frame 65 at 71 and includes oppositely disposed contactors 72 and 73 at the side of the pivot 71 opposite the link 68. The contactor 72 is adapted to engage and become disengaged from a fixed contact element 74 mounted upon the frame 65, and the contactor 73 is adapted to engage and become disengaged from a fixed contact element 75 mounted upon said frame 65. The conducting element 70 and the contact elements 74 and 75 are properly insulated from the frame. A lead wire 76 is attached to the conducting element 70, a lead wire 77 is attached to the fixed contact element 74, and a lead wire 78 is attached to the fixed contact element 75. The movable conducting element 70 and fixed contact element 74 are adapted to be in a circuit including the lead wires 76 and 77, and said movable conducting element 70 and fixed contact element 75 are adapted to be in a circuit including the lead wires 76 and 78. Either or both of said circuits may include a light, bell, motor, etc. The horizontal arm 62 of the L lever 63 is held to the pin 61 on the post 59 by a coil spring 79 having its lower end portion seated on a disc 80 threaded upon an upstanding screw 81 supported on the frame 65 at 82. A disc 83 carried by the upper end of the coil spring 79 supports a pin 84 which engages the lower surface of the horizontal arm 62 at location opposite the pin 61. The movable conducting element 70 is obviously adapted to be actuated to close the switch including the contactor 72 and the fixed contact element 74 upon decrease of pressure in the space 58 and to close the switch including the contactor 73 and the fixed contact element 75 upon increase of pressure in said space 58. Stated in broader language, the switches are actuated to be closed and open in response to actuation of the pressure-responsive element 12.

As hereinbefore set forth, the entire system or mechanism, consisting of the transmitter 10, the tube or pipe 13 and the pressure-responsive element, 11 in one instance and 12 in another instance, is solidly filled with liquid. Since liquid is essentially incompressible, any pressure exerted at the interior of the flexible element or bellows 17 of said transmitter 10 will be transmitted by the liquid in said system or mechanism to the pressure-responsive element thereof just as though said pressure-responsive element were located at the level of the transmitter.

In practice, the coil spring 23 is designed and adjusted to carry the weight or pressure due to the column of liquid between the pressure-responsive element 11 or 12 and the transmitter 10 so that when the water or liquid in the well, vessel or tank has fallen to the bottom of said transmitter 10, the system or mechanism is in exact equilibrium and no pressure is exerted at the elevation of the pressure-responsive element 11 or 12. After adjusting the tension of the coil spring 23 to exert a pull equal to the maximum total lift between the pressure-responsive element and the transmitter, said transmitter is sealed with solder around the adjusting screw 26. The transmitter 10 is filled with liquid of the nature as before set forth. Previous, however, to filling the transmitter, tubing of length to provide the tube or pipe 13 is soldered into the top of the transmitter, as at 49, and when the transmitter and tubing have been filled with the liquid, the end of the tubing is sealed closed with solder. A short tube 85, conveniently employed for filling the transmitter and tube or pipe 13, is secured in the upper closure wall 15, as at 86, and when the space 22 of said transmitter and said tube or pipe 13 are full of liquid the short tube is pinched shut and sealed, as at 87, with solder.

When installing the liquid level indicator in a well with a pump, such as 37, the transmitter is attached at a lower portion of the pump in any suitable and convenient manner, as, for example, in the manner as before stated. As the pump is lowered in the well and successive lengths of water column are added, the tubing for providing the tube or pipe 13 is uncoiled at the surface of the well and removably attached to the water column, as, for example, by employment of the clips 51. Clips of the nature as described facilitate removal of the tube or pipe 13 from the pump, as when said pump is taken out for repairs. After the pump has been completely installed, the upper end of the tubing for providing the tube or pipe 13 is cut off, to be made ready for assembly with a pressure-responsive element, such as 11 or 12, of the system or mechanism. Some of the liquid will be squeezed out of said system or mechanism when the upper end of the tubing is cut off, but the stops limiting upward and downward movement of the flexible element or bellows 17, and hence limiting the expanding and contracting action of the coil spring 23, will preclude the squeezing out of the tubing of more than an inconsequential amount of the liquid.

The pressure-responsive element or Bourdon tube 11 of Fig. 3 is desirably installed upside down as disclosed so as to conveniently retain the liquid and prevent the entrance of air, and said pressure-responsive element or Bourdon tube, previously filled with liquid, is attached to the upper end of the tube or pipe 13 in a fluid-tight manner. Desirably, a valve 88 is installed just above the Bourdon tube 11. With the gage 54 attached to the tube or pipe 13 said valve 88 is moved to open position by manipulation of the hand piece 89. A plug 90 in the top of the valve 88, which sealed off the Bourdon tube while being shipped, is removed. A piece of pipe (not shown) is attached to the passageway through the valve 88 and said piece of pipe is filled with liquid to be utilized in the system or mechanism. By means of an ordinary pump, or more conveniently by employment of a special apparatus, pressure may be exerted at the upper end of said piece of pipe and on the liquid contained therein until the gage 54 correctly denotes the total lift, in feet, for example, between said gage and the water level or surface then in the well. When pressure thus has been exerted in the system or mechanism and the valve 88 closed and the plug 90 replaced, the flexible element or bellows 17 will have moved downwardly sufficiently so that the vertical post 32 is somewhere between its two stops, provided by the lower closure wall 16 in cooperation with the downwardly facing shoulder 35 and the stud 36. This just mentioned result obviously follows because of the before mentioned adjustment of the tension of the coil spring 23 during the manufacture or assembly of the transmitter 10. When the gage 54 is made to denote the total lift, in the manner as set forth, the liquid level indicator is ready for operation.

When the level of water or liquid in the well, vessel or tank drops, the gage 54 will show an increase in the total lift, and vice versa. Should the level of water or liquid in said well, vessel or tank reach the low level of the transmitter 10, the total lift reading on the gage will, evidently, be that for which said gage was initially set when it appeared on the job. Such position of the gage corresponds to zero pressure in the pressure-responsive element or Bourdon tube 11. That is to say, zero pressure in said pressure-responsive element or Bourdon tube 11 corresponds to maximum lift denoted at the gage 54. With increase in depth of water or liquid in the well, vessel or tank the pressure in the pressure-responsive element or Bourdon tube increases and the total lift reading at the gage decreases, and vise versa. The tube or pipe 13 desirably includes a small fitting 91 at the upper portion thereof and the upper end of said fitting is closed by a removable plug 92. With the plug 92 removed, liquid may be better applied at this location of the system or mechanism and air may be more readily removed.

If it is desired to provide an adjustment for the system or mechanism, a device similar to an ordinary valve may be installed between the pressure-responsive element and the shut-off valve 88. Such a device includes an element 93 arranged for longitudinal movement in a packing gland 94 by manipulation of a hand piece 95. The element 93 is adapted to be adjustably moved into and out of the passageway 96 between the tube or pipe 13 and the Bourdon tube 11 to alter the size of said passageway and thus alter the overall size of the system or mechanism. Obviously, by causing a greater portion of the element 93 to be situated in the passageway 96, displacement of the liquid and the pressure in the system or mechanism is increased, and vice versa.

The disclosure of Fig. 4 includes the elements 88, 89, 90, 91, 92, 93, 94, 95 and 96 as described in connection with Fig. 3, and these mentioned elements are manipulated and function in a liquid level indicator including a switch, or switches, as in said Fig. 4, in substantially the manner as has been described.

The object in placing the Bourdon tube upside down, and in arranging the space 58 at the upper side of the bellows 55 with communication between said space 58 and the passageway 96 and valve 88 at the upper side of the housing 56, is to make provision for the ready removal of air from the system or mechanism. The air will rise to the surface of the liquid where it may be easily allowed to escape and the assembly thus filled solid with liquid. In filling the system or mechanism with liquid it is highly desirable to allow the entire system or mechanism to stand open to the atmosphere for a time to permit entrained air to escape.

The liquid level indicator can be reset at any time in the same manner as hereinbefore set forth in connection with original installation of said liquid level indicator.

The volume of liquid in the pressure-responsive element 11 or 12 of the liquid level indicator and in the portion of the tube or pipe 13 above and near the earth's surface is relatively small compared to the total volume of liquid in the system or mechanism. Thus, the effect of surface temperature variations is negligible and does not have tendency toward making for inaccurate readings at the gage 54 or inaccurate results at the switches of Fig. 4. In any instance where the water or liquid in the well, vessel or tank remains at substantially constant temperature, the liquid level indicator will produce accurate readings and/or results.

Evidently, the separate circuits controlled by the switches 70, 74 and 70, 75, respectively, can include entities for lighting lamps, sounding signals, starting and stopping motors, etc.

What is claimed is:

1. In a liquid level indicator, a mechanism filled solid with liquid and constituted as a pressure-responsive element and a transmitter, said transmitter including a hollow member adapted to be situated in a well below said pressure-responsive element, a tube connecting said hollow member and said pressure-responsive element with each other, an expansible and contractible flexible element secured to said hollow member adapted to be subjected to pressure of water in said well, and a tension spring within said hollow member supporting said expansible and contractible flexible element and substantially the weight of a column of said liquid in said hollow member and tube extending from said flexible element substantially to said pressure-responsive element, said tension spring having one of its ends secure with said hollow member and its other end secure with a part of said expansible and contractible flexible element capable of movement relatively to the hollow member.

2. In a liquid level indicator, a mechanism filled solid with liquid and constituted as a pressure-responsive element and a transmitter, said transmitter including a hollow member adapted to be situated in a well below said pressure-responsive element, a tube connecting said hollow member and said pressure-responsive element with each other, an expansible and contractible flexible element secured to said hollow member adapted to be subjected to pressure of water in said well, a tension spring within said hollow member supporting said expansible and contractible flexible element and substantially the weight of a column of said liquid in said hollow member and tube extending from said flexible element substantially to said pressure-responsive element, and means supporting one end of said tension spring upon said hollow member for initially adjusting the tension spring toward and away from said expansible and contractible flexible element, said tension spring having its other end secure with a part of the expansible and contractible flexible element capable of movement relatively to the hollow member.

3. In a liquid level indicator, a mechanism filled solid with liquid and constituted as a pressure-responsive element and a transmitter, said transmitter including a hollow member adapted to be situated in a well below said pressure-responsive element, a tube connecting said hollow member and said pressure-responsive element with each other, an expansible and contractible flexible element secured to said hollow member adapted to be subjected to pressure of water in said well, a tension spring within said hollow member supporting said expansible and contractible flexible element and substantially the weight of a column of said liquid in said hollow member and tube extending from said flexible element substantially to said pressure-responsive element, stops for limiting both expanding and contracting movement of said flexible element, and means supporting one end of said tension spring upon said hollow member for initially adjusting the tension spring toward and away from said expansible and contractible flexible element and relatively to said stops, said tension spring having its other end secure with a part of the expansible and contractible flexible element capable of movement relatively to the hollow member.

ADOLPH F. MEYER.